(12) United States Patent  
Schuller et al.

(10) Patent No.: US 8,972,892 B2  
(45) Date of Patent: Mar. 3, 2015

(54) NOTIFICATION IN IMMERSIVE APPLICATIONS

(75) Inventors: Donald Geoffrey Schuller, San Jose, CA (US); Jeremy Godfrey Lyon, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 166 days.

(21) Appl. No.: 12/984,401

(22) Filed: Jan. 4, 2011

(65) Prior Publication Data

US 2011/0167383 A1 Jul. 7, 2011

Related U.S. Application Data

(60) Provisional application No. 61/292,462, filed on Jan. 5, 2010.

(51) Int. Cl.  
*G06F 9/44* (2006.01)

(52) U.S. Cl.  
CPC .................................. *G06F 9/4443* (2013.01)  
USPC ......................................................... 715/808

(58) Field of Classification Search  
CPC .............................. G06F 9/4443; G06F 9/542  
USPC ......................................................... 715/808  
See application file for complete search history.

(56) References Cited

U.S. PATENT DOCUMENTS

| | | | |
|---|---|---|---|
| 6,628,315 B1 * | 9/2003 | Smith Dawkins et al. | 715/856 |
| 6,681,000 B1 * | 1/2004 | Moriguchi et al. | 379/90.01 |
| 7,250,955 B1 * | 7/2007 | Beeman et al. | 345/592 |
| 7,319,388 B2 * | 1/2008 | Ichinowatari | 340/540 |
| 2002/0172330 A1 * | 11/2002 | Brunelle et al. | 379/67.1 |
| 2004/0194110 A1 * | 9/2004 | McKee et al. | 719/310 |
| 2006/0205517 A1 * | 9/2006 | Malabuyo et al. | 463/43 |
| 2006/0277478 A1 * | 12/2006 | Seraji et al. | 715/760 |
| 2008/0276170 A1 * | 11/2008 | Bonansea et al. | 715/708 |
| 2010/0257490 A1 * | 10/2010 | Lyon et al. | 715/863 |

* cited by examiner

*Primary Examiner* — Jennifer To  
*Assistant Examiner* — Ashley Fortino  
(74) *Attorney, Agent, or Firm* — Mahamedi Paradice LLP (57) ABSTRACT

A notification framework delivers notifications in a manner that is appropriate for a user's current experience. An API is implemented in the notification framework and provided to developers to develop applications utilizing such API to communicate with the framework. A display mode of an active application is determined by the framework. A notification generated by an alerting application is captured by the framework. The framework determines a mode of delivery based on the display mode and the notification, and delivers the notification accordingly.

12 Claims, 8 Drawing Sheets

NOTIFICATION IN IMMERSIVE APPLICATIONS

CROSS REFERENCE TO RELATED APPLICATION

This application claims the benefit of U.S. Provisional Patent Application Ser. No. 61/292,462, entitled "Notification In Immersive Applications," filed on Jan. 5, 2010, which is hereby incorporated by reference in its entirety.

BACKGROUND

1. Field of Art

The disclosure generally relates to the field of notification rendering in computing devices.

2. Description of Art

Modern mobile computing devices typically run multiple applications simultaneously to perform different tasks. These applications often generate notifications to bring various matters to the attention of a user. The notifications are often displayed using visual interrupts. This is highly undesirable when the user is fully engaged with another application (e.g., playing a video game or typing in an electronic mail (email) application). Accordingly, there is lacking, inter alia, techniques for mobile computing devices to deliver notifications in a manner that is minimally intrusive to a user experience.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

General Overview

One embodiment of a disclosed system (and method and computer readable storage medium) provides display for visual notifications that are appropriate for, or correspond to, a current user experience. The system determines a display mode of the active application (e.g., whether the active application is in full screen mode) along with its configuration and user preference, determines a mode of delivery for a notification based at least in part on the display mode and the notification, and delivers the notification accordingly.

Example Mobile Computing Device

Figure 1A:
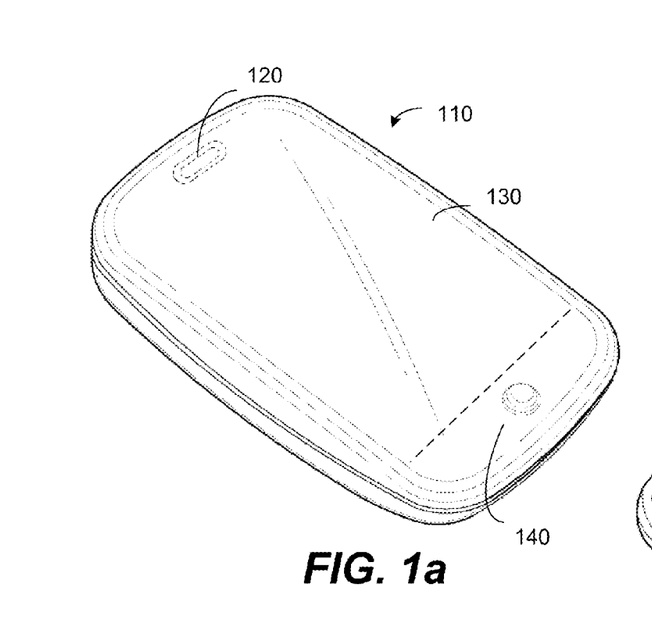
FIG. 1a illustrates one embodiment of a mobile computing device in a first positional state.
Figure 1B:
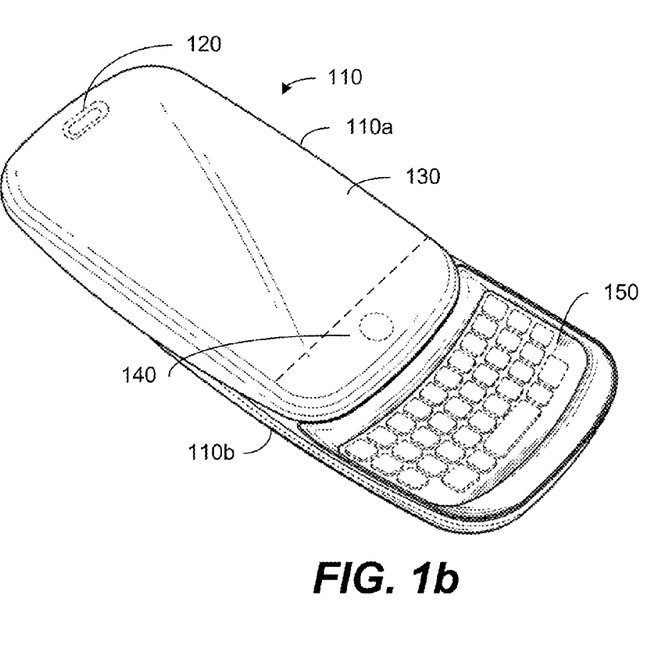
FIG. 1b illustrates one embodiment of the mobile computing device in a second positional state.

In one example embodiment, the configuration as disclosed may be configured for use between a mobile computing device, that may be host device, and an accessory device. FIGS. 1a and 1b illustrate one embodiment of a mobile computing device 110. Figure FIG. 1a illustrates one embodiment of a first positional state of the mobile computing device 110 having telephonic functionality, e.g., a mobile phone or smartphone. FIG. 1b illustrates one embodiment of a second positional state of the mobile computing device 110 having telephonic functionality, e.g., a mobile phone, smartphone, netbook, or laptop computer. The mobile computing device 110 is configured to host and execute a phone application for placing and receiving telephone calls.

It is noted that for ease of understanding the principles disclosed herein are in an example context of a mobile computing device 110 with telephonic functionality operating in a mobile telecommunications network. However, the principles disclosed herein may be applied in other duplex (or multiplex) telephonic contexts such as devices with telephonic functionality configured to directly interface with public switched telephone networks (PSTN) and/or data networks having voice over internet protocol (VoIP) functionality. Likewise, the mobile computing device 110 is only by way of example, and the principles of its functionality apply to other computing devices, e.g., desktop computers, server computers and the like.

The mobile computing device 110 includes a first portion 110a and a second portion 110b. The first portion 110a comprises a screen for display of information (or data) and may include navigational mechanisms. These aspects of the first portion 110a are further described below. The second portion 110b comprises a keyboard and also is further described below. The first positional state of the mobile computing device 110 may be referred to as an "open" position, in which the first portion 110a of the mobile computing device slides in a first direction exposing the second portion 110b of the mobile computing device 110 (or vice versa in terms of movement). The mobile computing device 110 remains operational in either the first positional state or the second positional state.

The mobile computing device 110 is configured to be of a form factor that is convenient to hold in a user's hand, for example, a personal digital assistant (PDA) or a smart phone form factor. For example, the mobile computing device 110 can have dimensions ranging from 7.5 to 15.5 centimeters in length, 5 to 15 centimeters in width, 0.5 to 2.5 centimeters in thickness and weigh between 50 and 250 grams.

The mobile computing device 110 includes a speaker 120, a screen 130, and an optional navigation area 140 as shown in the first positional state. The mobile computing device 110 also includes a keypad 150, which is exposed in the second positional state. The mobile computing device also includes a microphone (not shown). The mobile computing device 110 also may include one or more switches (not shown). The one or more switches may be buttons, sliders, or rocker switches and can be mechanical or solid state (e.g., touch sensitive solid state switch).

The screen 130 of the mobile computing device 110 is, for example, a 240×240, a 320×320, a 320×480, or a 640×480 touch sensitive (including gestures) display screen. The screen 130 can be structured from, for example, such as glass, plastic, thin-film or composite material. The touch sensitive screen may be a transflective liquid crystal display (LCD) screen. In alternative embodiments, the aspect ratios and resolution may be different without departing from the principles of the inventive features disclosed within the description. By way of example, embodiments of the screen 130 comprises an active matrix liquid crystal display (AMLCD), a thin-film transistor liquid crystal display (TFT-LCD), an organic light emitting diode (OLED), an interferometric modulator display (IMOD), a liquid crystal display (LCD), or other suitable display device. In an embodiment, the display displays color images. In another embodiment, the screen 130 further comprises a touch-sensitive display (e.g., pressure-sensitive (resistive), electrically sensitive (capacitive), acoustically sensitive (SAW or surface acoustic wave), photo-sensitive (infra-red)) including a digitizer for receiving input data, commands or information from a user. The user may use a stylus, a finger or another suitable input device for data entry, such as selecting from a menu or entering text data.

The optional navigation area 140 is configured to control functions of an application executing in the mobile computing device 110 and visible through the screen 130. For example, the navigation area includes an x-way (x is a numerical integer, e.g., 5) navigation ring that provides cursor control, selection, and similar functionality. In addition, the navigation area may include selection buttons to select functions displayed through a user interface on the screen 130. In addition, the navigation area also may include dedicated function buttons for functions such as, for example, a calendar, a web browser, an e-mail client or a home screen. In this example, the navigation ring may be implemented through mechanical, solid state switches, dials, or a combination thereof. In an alternate embodiment, the navigation area 140 may be configured as a dedicated gesture area, which allows for gesture interaction and control of functions and operations shown through a user interface displayed on the screen 130.

The keypad area 150 may be a numeric keypad (e.g., a dialpad) or a numeric keypad integrated with an alpha or alphanumeric keypad or character keypad 150 (e.g., a keyboard with consecutive keys of Q-W-E-R-T-Y, A-Z-E-R-T-Y, or other equivalent set of keys on a keyboard such as a DVORAK keyboard or a double-byte character keyboard).

Although not illustrated, it is noted that the mobile computing device 110 also may include an expansion slot. The expansion slot is configured to receive and support expansion cards (or media cards). Examples of memory or media card form factors include COMPACTFLASH, SD CARD, XD CARD, MEMORY STICK, MULTIMEDIA CARD, SDIO, and the like.

Example Mobile Computing Device Architectural Overview

Figure 2:
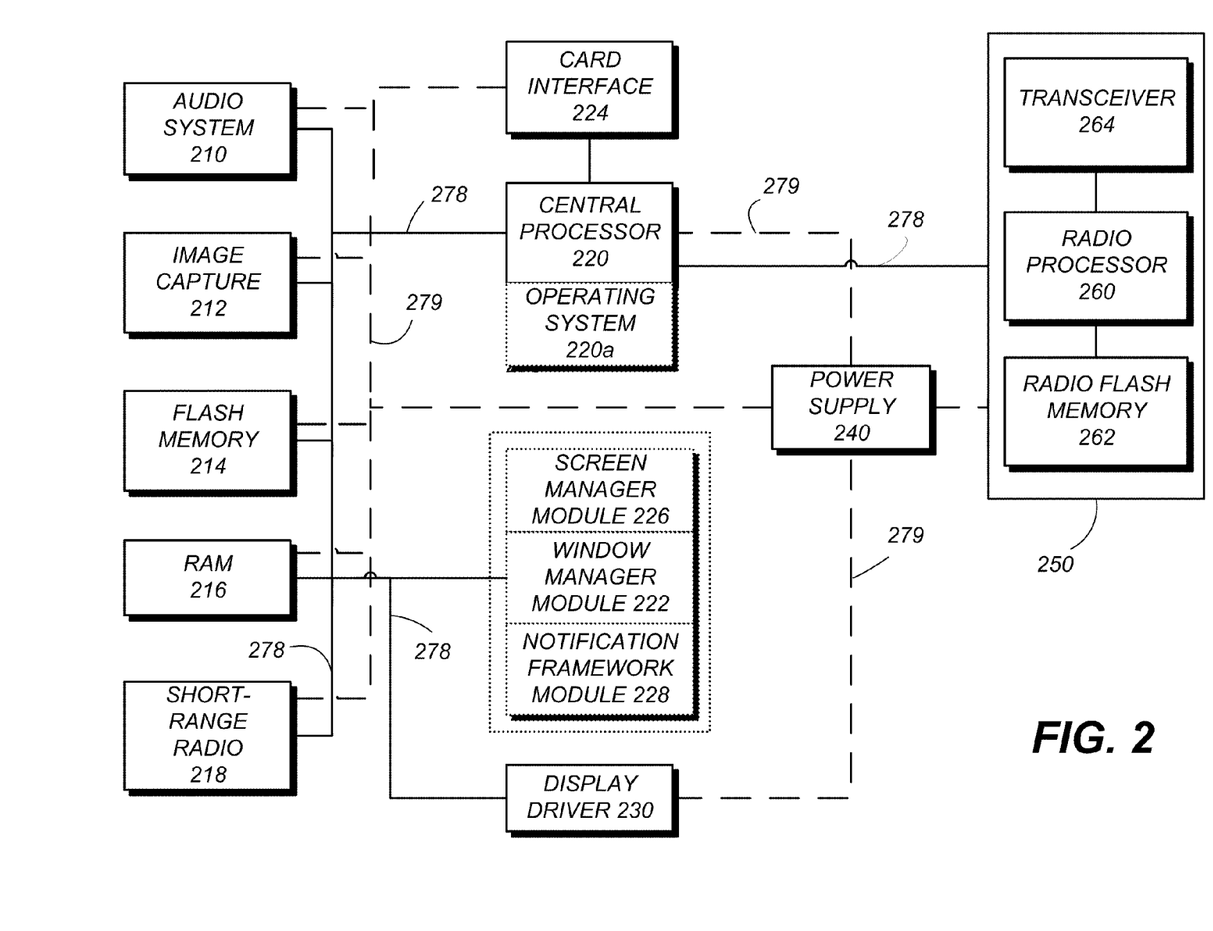
FIG. 2 illustrates one embodiment of an architecture of a mobile computing device.

Referring next to FIG. 2, a block diagram illustrates one embodiment of an architecture of a mobile computing device 110, with telephonic functionality. By way of example, the architecture illustrated in FIG. 2 will be described with respect to the mobile computing device of FIGS. 1a and 1b. The mobile computing device 110 includes a central processor 220, a power supply 240, and a radio subsystem 250. Examples of a central processor 220 include processing chips and system based on architectures such as ARM (including cores made by microprocessor manufacturers), ARM XSCALE, AMD ATHLON, SEMPRON or PHENOM, INTEL ATOM, XSCALE, CELERON, CORE, PENTIUM or ITANIUM, IBM CELL, POWER ARCHITECTURE, SUN SPARC and the like.

The central processor 220 is configured for operation with a computer operating system 220a. The operating system 220a is an interface between hardware and an application, with which a user typically interfaces. The operating system 220a is responsible for the management and coordination of activities and the sharing of resources of the mobile computing device 110. The operating system 220a provides a host environment for applications that are run on the mobile computing device 110. As a host, one of the purposes of an operating system is to handle the details of the operation of the mobile computing device 110. Examples of an operating system include PALM OS and WEBOS, MICROSOFT WINDOWS (including WINDOWS 7, WINDOWS CE, and WINDOWS MOBILE), SYMBIAN OS, RIM BLACKBERRY OS, APPLE OS (including MAC OS and IPHONE OS), GOOGLE ANDROID, and LINUX.

The central processor 220 communicates with an audio system 210, an image capture subsystem (e.g., camera, video or scanner) 212, flash memory 214, RAM memory 216, and a short range radio module 218 (e.g., Bluetooth, Wireless Fidelity (WiFi) component (e.g., IEEE 802.11)). The central processor 220 communicatively couples these various components or modules through a data line (or bus) 278. The power supply 240 powers the central processor 220, the radio subsystem 250 and a display driver 230 (which may be contact- or inductive-sensitive). The power supply 240 may correspond to a direct current source (e.g., a battery pack, including rechargeable) or an alternating current (AC) source. The power supply 240 powers the various components through a power line (or bus) 279.

The central processor communicates with applications executing within the mobile computing device 110 through the operating system 220a. In addition, intermediary components, for example, a window manager module 222 and a screen manager module 226, provide additional communication channels between the central processor 220 and operating system 220 and system components, for example, the display driver 230.

It is noted that in one embodiment, central processor 220 executes logic (e.g., by way of programming, code, or instructions) corresponding to executing applications interfaced through, for example, the navigation area 140 or switches. It is noted that numerous other components and variations are possible to the hardware architecture of the computing device 200, thus an embodiment such as shown by FIG. 2 is just illustrative of one implementation for an embodiment.

In one embodiment, the window manager module 222 comprises a software (e.g., integrated with the operating system) or firmware (lower level code that resides is a specific memory for that code and for interfacing with specific hardware, e.g., the processor 220). The window manager module 222 is configured to initialize a virtual display space, which may be stored in the RAM 216 and/or the flash memory 214. The virtual display space includes one or more applications currently being executed by a user and the current status of the executed applications. The window manager module 222 receives requests, from user input or from software or firmware processes, to show a window and determines the initial position of the requested window. Additionally, the window manager module 222 receives commands or instructions to modify a window, such as resizing the window, moving the window or any other command altering the appearance or position of the window, and modifies the window accordingly.

The screen manager module 226 comprises a software (e.g., integrated with the operating system) or firmware. The screen manager module 226 is configured to manage content that will be displayed on the screen 130. In one embodiment, the screen manager module 226 monitors and controls the physical location of data displayed on the screen 130 and which data is displayed on the screen 130. The screen manager module 226 alters or updates the location of data as viewed on the screen 130. The alteration or update is responsive to input from the central processor 220 and display driver 230, which modifies appearances displayed on the screen 130. In one embodiment, the screen manager 226 also is configured to monitor and control screen brightness. In addition, the screen manager 226 is configured to transmit control signals to the central processor 220 to modify power usage of the screen 130.

A notification framework module 228 comprises software and/or firmware configured to deliver notifications in a manner that is appropriate for the user's current experience (e.g., complimentary to the user experience and not disruptive). In one embodiment, the notification framework module 228 is configured to infer a user current experience based on how the active application is displayed, and discovers applicable notification configuration and user preference. When a notification (or an alarm) is issued, the module 228 determines the appropriate delivery mode for the notification, and accordingly delivers the notification in that mode.

In one embodiment, to facilitate interactions between the notification framework module 228 and applications running on the mobile computing device 110, the notification framework module 228 implements an application programming interface (API). The API is made available to developers such that they can develop applications utilizing the API functionality implemented by the module 228. The API provides routines (e.g., functions, procedures) and data structures (e.g., data types) that can be used for an application to communicate with the notification framework module 228 regarding notifications generated by the application. For example, the application can specify notification type, description, and user's options to the notification framework module 228 using the API functionality. In one embodiment, the API also provides routines and data structures for an application to communicate with the module 228 regarding how notifications can be displayed while that application is actively running and on display on the screen 130 of the mobile computing device 110. For example, the application can specify its display mode, notification configuration, and user preference to the notification framework module 228 using the API functionality. In addition, the API may also define routines that developers can implement in the applications, such that the module 228 can invoke the routines to communicate with the applications implementing these routines.

The radio subsystem 250 includes a radio processor 260, a radio memory 262, and a transceiver 264. The transceiver 264 may be two separate components for transmitting and receiving signals or a single component for both transmitting and receiving signals. In either instance, it is referenced as a transceiver 264. The receiver portion of the transceiver 264 communicatively couples with a radio signal input of the device 110, e.g., an antenna, where communication signals are received from an established call (e.g., a connected or on-going call). The received communication signals include voice (or other sound signals) received from the call and processed by the radio processor 260 for output through the speaker 120. The transmitter portion of the transceiver 264 communicatively couples a radio signal output of the device 110, e.g., the antenna, where communication signals are transmitted to an established (e.g., a connected (or coupled) or active) call. The communication signals for transmission include voice, e.g., received through the microphone of the device 110, (or other sound signals) that is processed by the radio processor 260 for transmission through the transmitter of the transceiver 264 to the established call.

In one embodiment, communications using the described radio communications may be over a voice or data network. Examples of voice networks include Global System of Mobile (GSM) communication system, a Code Division, Multiple Access (CDMA system), and a Universal Mobile Telecommunications System (UMTS). Examples of data networks include General Packet Radio Service (GPRS), third-generation (3G) mobile (or greater), High Speed Download Packet Access (HSDPA), High Speed Uplink Packet Access (HSUPA), and Worldwide Interoperability for Microwave Access (WiMAX).

While other components may be provided with the radio subsystem 250, the basic components shown provide the ability for the mobile computing device to perform radio-frequency communications, including telephonic communications. In an embodiment, many, if not all, of the components under the control of the central processor 220 are not required by the radio subsystem 250 when a telephone call is established, e.g., connected or ongoing. The radio processor 260 may communicate with central processor 220 using the data line (or bus) 278.

The card interface 224 is adapted to communicate, wirelessly or wired, with external accessories (or peripherals), for example, media cards inserted into the expansion slot (not shown). The card interface 224 transmits data and/or instructions between the central processor and an accessory, e.g., an expansion card or media card, coupled within the expansion slot. The card interface 224 also transmits control signals from the central processor 220 to the expansion slot to configure the accessory. It is noted that the card interface 224 is described with respect to an expansion card or media card; it also may be structurally configured to couple with other types of external devices for the device 110, for example, an inductive charging station for the power supply 240 or a printing device.

Example Architecture of Notification Framework Module

Figure 3:
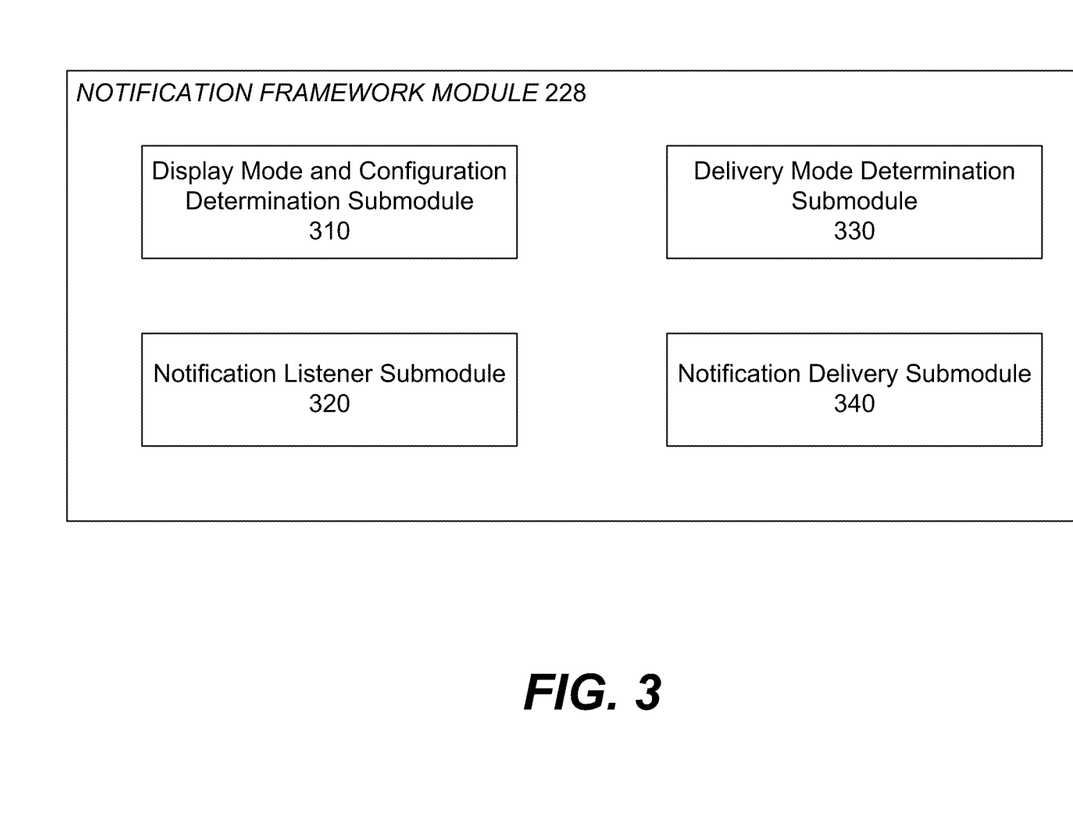
FIG. 3 illustrates one embodiment of an architecture of a notification framework module.

Referring now to FIG. 3, a block diagram illustrating sub-modules within the notification framework module 228 according to one embodiment. Some embodiments of module 228 have different and/or other modules than the ones described herein. Similarly, the functions can be distributed among the modules in accordance with other embodiments in a different manner than is described here. As illustrated, the notification framework module 228 includes a display mode and configuration determination submodule 310, a notification listener submodule 320, a delivery mode determination submodule 330, and a notification delivery submodule 340.

The display mode and configuration determination submodule 310 is configured to determine how the active application is displayed. The active application is the application that is currently running on the mobile computing device 110 and displayed on the screen 130. In one embodiment, the submodule 310 determines the display mode of the active application through the API (e.g., by calling an API function implemented by the active application, or by an API function implemented by the notification framework module 228 and called by the active application). Alternatively or additionally, the submodule 310 can determine the display mode through modules such as the window manager module 222 and the screen manager module 226.

Figure 7A:
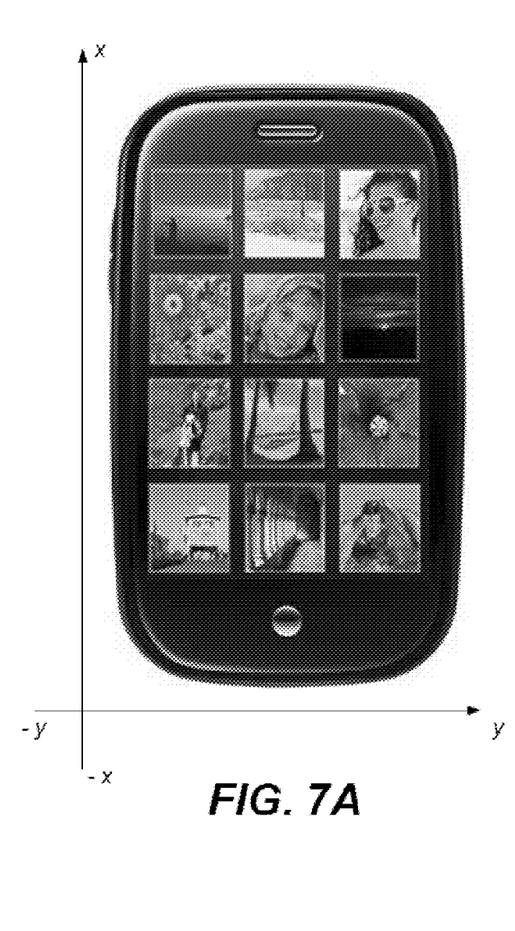
Figure 7B:
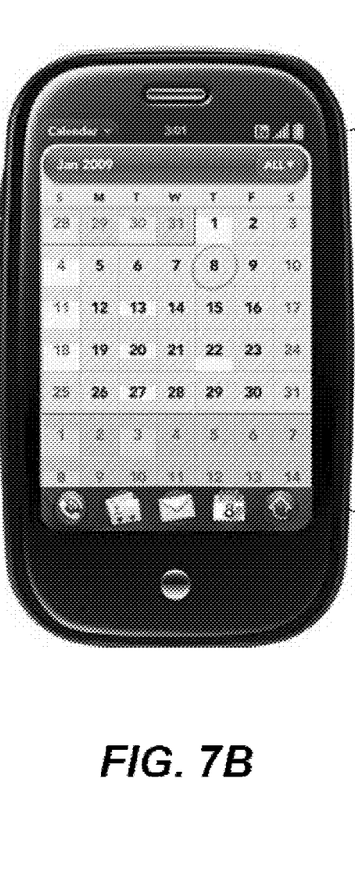
Figure 7C:
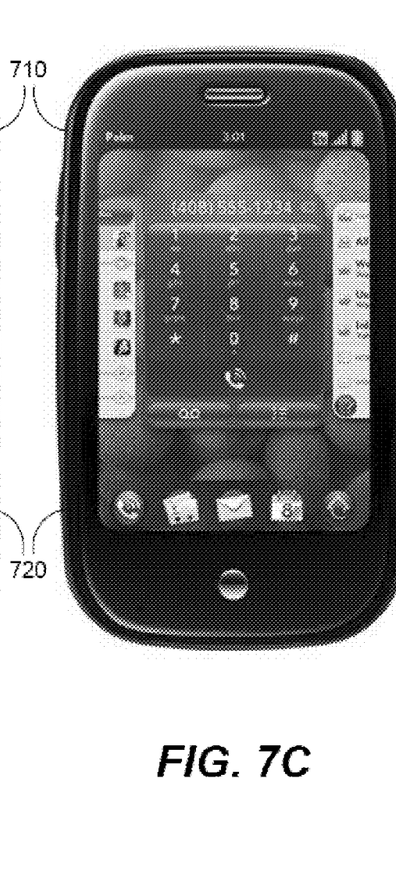

The display of an application can take over the entire screen 130 (called full screen mode or immersive mode) or only part of the screen 130. When the application is not in full screen mode, the screen 130 displays a notification bar (also called dashboard) on one side of the screen (e.g., top or bottom). The notification bar contains notification indicators (e.g., battery level, network strength, etc.). The user can select the indicators on the notification bar to learn more about the corresponding notifications. FIGS. 7B and 7C shows example applications not displayed in full screen mode. As shown, the example applications are displayed in between the notification bar 710 and the task bar 720. When an application is in full screen mode, its display occupies the entire screen 130 and the notification bar is not displayed on the screen 130. FIG. 7A shows an application in full screen mode. As shown, when the application is in full screen mode, only that application is displayed on the screen 130 and nothing else (e.g., the notification bar 710 and the task bar 720). Some applications (e.g., games and video conferencing) run in full screen mode to maximize display and minimize unrelated interruptions. Thus, by determining (or learning) the display mode of the current running application, the notification framework module 228 can infer the current viewing experience of the user.

The display mode and configuration determination submodule 310 also determines application configuration and user preference relevant to notification delivery. In one embodiment, the developer of an application can specify in the application configuration how a notification should be delivered when that application is running. For example, the application configuration can temporarily suppress or completely prohibit banner notifications (e.g., banner notifications for new text or email messages). The application can also enable the user to set up a user preference regarding how notifications should be delivered while the application is running. The application configuration and the user preference can be transmitted to the submodule 310 through the API. Thus, the developer as well as the user can configure the application to ensure that notifications are complimentary to the user experience and not disruptive.

The notification listener submodule 320 is configured to detect notifications from applications generating the notifications (hereinafter call the alerting applications). In one embodiment, the alerting application transmitting information about the generated notification to the notification listener submodule 320 through the API. For example, the alerting application can specify a desirable notification delivery mode for a generated notification to the notification listener submodule 320 through an API call. Example notification delivery modes include transient banner notification, dashboard icon banner notification, and popup notification.

A transient banner notification is a banner displayed on the bottom (or top) of the screen 130. The visual content previously displayed on the banner area can be either hidden or pushed up. The user can interact with the notification by selecting the banner (e.g., clicking on it). If the user ignores the banner for a predetermined period of time (e.g., 5 seconds), the notification framework module 228 hides the banner and leaves no trace behind. The transient banner notification can be used to deliver time sensitive information (e.g., a piece of news) or information with relatively low importance.

A dashboard icon banner notification includes a banner message and a summary icon displayed on the notification bar (at the same time or after the banner message disappears). Unlike the banner message, which is displayed temporarily and will disappear by itself, the summary icon is displayed persistently on the notification bar until the user positively dismisses it (e.g., by invoking its menu and selecting to dismiss the notification, or flicking it off screen). The dashboard icon banner notification can be used for notifications with persistent importance, such as new text or email messages.

A popup notification is a popup dialog box displayed on the bottom (or top, center) of the screen 130 containing a message and one or more buttons for the user to select. The popup notification can be used for notifications that require a user's immediate attention or notifications with options for the user to select, such as incoming phone calls. The user must respond to a popup notification (e.g., by tapping on one of the buttons (e.g., by a finger or stylus)) in order to dismiss it.

The delivery mode determination submodule 330 is configured to determine an appropriate mode to deliver a notification based on the notification and the active application (e.g., characteristics such as display mode, application configuration, user preference). In one embodiment, if the active application is not in full screen mode, the submodule 330 determines the mode specified by the alerting application as the appropriate mode. However, when the active application is in full screen mode, the submodule 330 determines whether the delivery mode specified by the alerting application is appropriate, and if not then selects another mode for the notification.

For example, if the active application is in full screen mode, the delivery mode determination submodule 330 can choose to deliver the notification in the following two modes: transient banner notification and popup notification. In this example, if the alerting application specifies that a notification is to be delivered as a dashboard icon banner notification, the submodule 330 would deliver the notification as a transient banner notification. However, when the active application subsequently exits full screen mode, the submodule 330 displays an icon of the notification (the dashboard icon) on the notification banner. In one embodiment, the active application can suppress transient banner notifications (e.g., through the API) but not the popup notifications.

When determining the notification delivery mode, the delivery mode determination submodule 330 can take into account characteristics of the active application such as the application configuration and user preference of the active application. For example, if the active application itself supports a notification delivery mechanism (e.g., a message panel), the submodule 330 may transmit certain notifications to the active application to be delivered in the supported mechanism, rather than delivering the notifications itself. In one embodiment, the alerting application can specify notification delivery modes for different scenarios (e.g., whether the active application is in full screen mode, whether the mobile computing device 110 is placed vertically (or upright) or horizontally (or on its side)) through the API. The orientation of the mobile computing device 110 can be determined based on an on-device Gyroscope and a coordinate system of the mobile computing device 110. FIG. 7A illustrates such a coordinate system. For example, if the x axis of the coordinate system is upright, then the device 110 is determined vertical, and if the y axis is determined upright, then the device 110 is determined horizontal. The submodule 330 can determine the applicable scenario and the corresponding notification delivery mode specified by the alerting application, and determine whether that mode is appropriate.

The notification delivery submodule 340 is configured to notify the active application the notification delivery, deliver the notification to the user in the appropriate mode determined by the delivery mode determination submodule 330, and detect any user response. By notifying the active application of the upcoming notification delivery, the notification delivery submodule 340 gives the active application a chance to pause, such that the user can concentrate on the notification. If the user selects the displayed notification or buttons displayed therein, the notification delivery submodule 340 detects the user selection, and transmits the user selection to the alerting application for further processing. In one embodiment, to prevent false notification activation, the submodule 340 ignores user inputs for a brief period of time (e.g., ¾ second) immediately after the notification is delivered.

Example Process of Notification Framework Module

Figure 4:
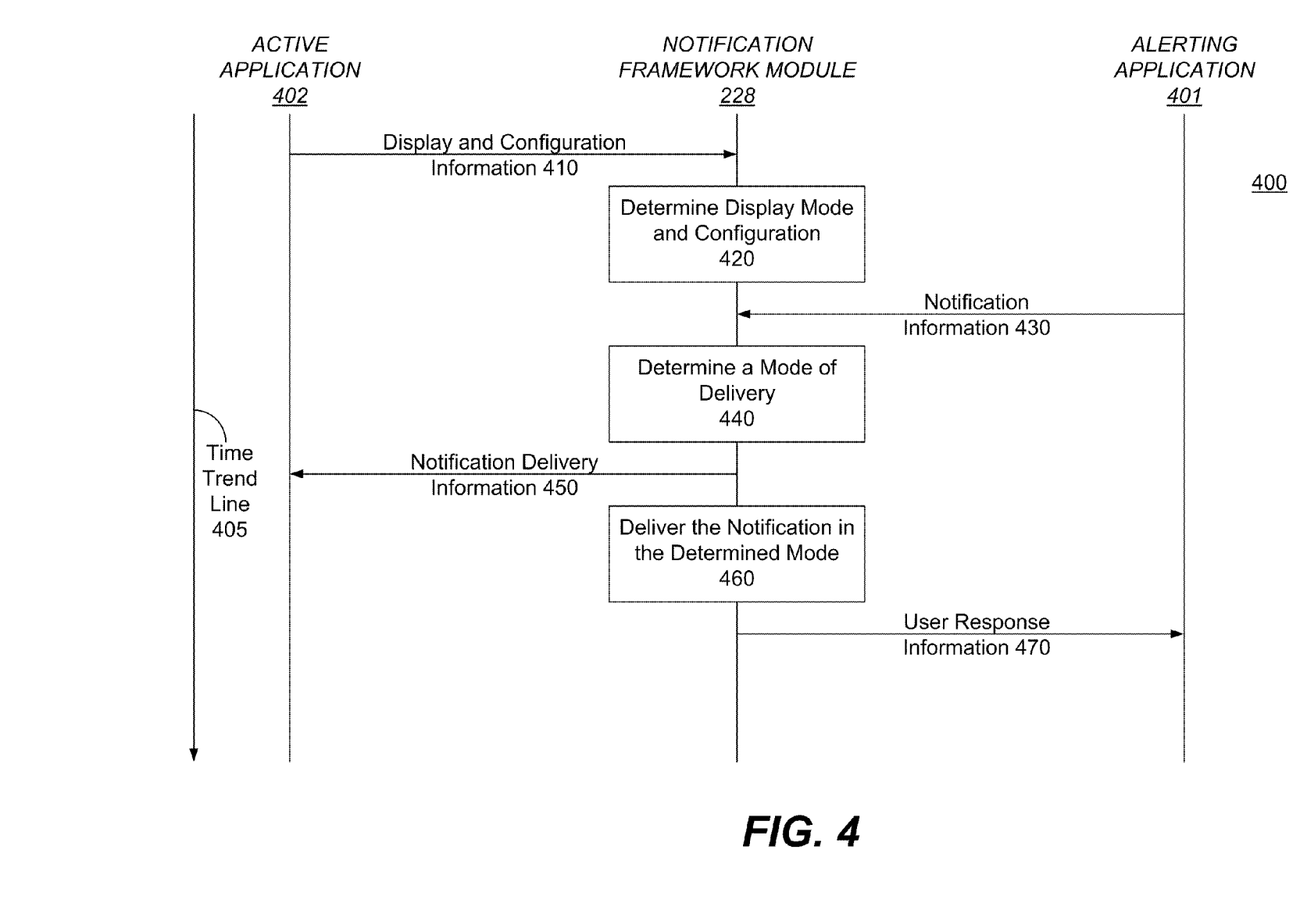
FIG. 4 illustrates one embodiment of a process of a notification framework module.

Referring now to FIG. 4, a timing diagram of a process 400 illustrating interactions among the notification framework module 228, an alerting application 401, and an active application 402 according to one embodiment. The diagram has a linear trend line 405 indicating the direction of the time. Other embodiments can perform the steps of the process 400 in different orders. Moreover, other embodiments can include different and/or additional steps than the ones described herein.

As shown, the active application 402 transmits 410 display information and configuration information (including user preference information) to the notification framework module 228 (e.g., through the API). The active application 402 is an application that is running on the mobile computing device 110 and displayed on the screen 130. Examples of the active application 402 include immersive applications such as games and video conferencing applications (applications that run/display in immersive mode). The notification framework module 228 determines 420 the display mode and application configuration/user preference for the active application 402 based on the received information.

The alerting application 401 transmits 430 notification information to the notification framework module 228. There can be multiple alerting applications 401 generating notifications, even though only one is shown in FIG. 4 for clarity. Examples of the alerting application 401 include phone applications, email applications, calendar applications, SMS (Short Message Service) applications, battery management applications, to name a few. The notification framework module 228 determines 440 an appropriate mode of delivery for the notification received from the alerting application 401 based on the information received from the alerting application 401 and the active application 402.

The notification framework module 228 transmits 450 notification delivery information to the active application 402. Such information includes mode of delivery (e.g., banner notification, popup notification) and related details (e.g., associated alerting application). For example, if the notification to be delivered requires immediate attention from the user (e.g., incoming phone call), the notification framework module 228 may notify (or request) the active application to pause. After receiving such information, the active application 402 may optionally pause (e.g., when the active application 402 is in full display mode) such that the user can pay attention to the notification.

The notification framework module 228 delivers 460 the notification in the determined mode, detects any user interaction with the notification, and transmits 470 such user response or lack of user response to the alerting application 401 for proper processing.

Figure 5A:
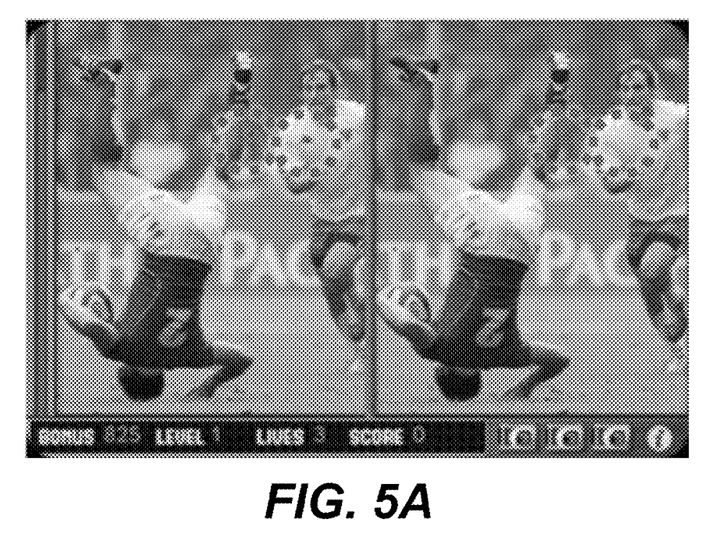
FIGS. 5A-C, 6A-B, and 7A-C are screenshots of the mobile computing device according to one embodiment.
Figure 5B:
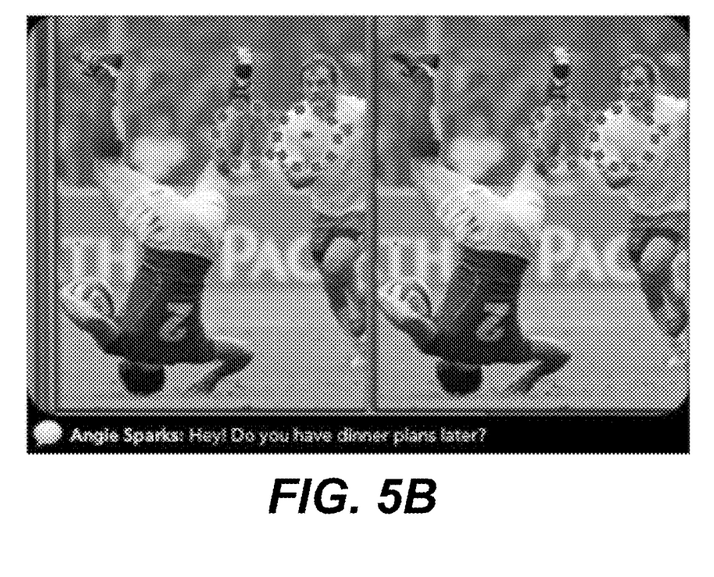
Figure 5C:
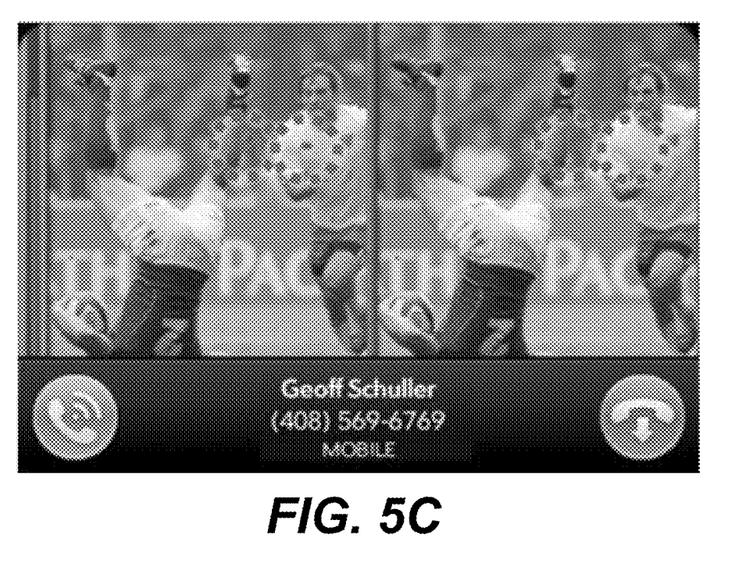

The process 400 can be illustrated in further detail through the following example and FIGS. 5A-C. A user plays a video game in full screen mode on the mobile computing device 110. As shown in FIG. 5A, the game takes over the entire screen 130 of the mobile computing device 110. The notification framework module 228 receives 410 display information and configuration information from the game, and determines 420 that the game is in full screen mode. An SMS application running on the mobile computing device 110 receives a text message and transmits 430 the message to the notification framework module 228, which determines 440 that the message should be displayed as a transient banner notification and notifies 450 the game application about the notification. As shown in FIG. 5B, the notification framework module 228 displays 460 the SMS message on the bottom of the display as a transient banner message. If the user does not select the banner message (e.g., by tapping on the banner), the banner message disappears after a brief delay.

A phone application running on the mobile computing device 110 subsequently receives an incoming call, and transmits 430 information about the call to the notification framework module 228, which determines 440 that the notification should be displayed as a popup notification and notifies 450 the game. As a result, the game application pauses the game. As shown in FIG. 5C, the notification framework module 228 delivers 460 the popup notification as a popup dialog with information about the incoming call, and provides the user with options to pick up the call or hang up. If desirable, the user can ignore the call by tapping the hang up button, and continue with the game. Alternatively, the user can choose to answer the call by tapping the answer button.

Notification Customization

Figure 6A:
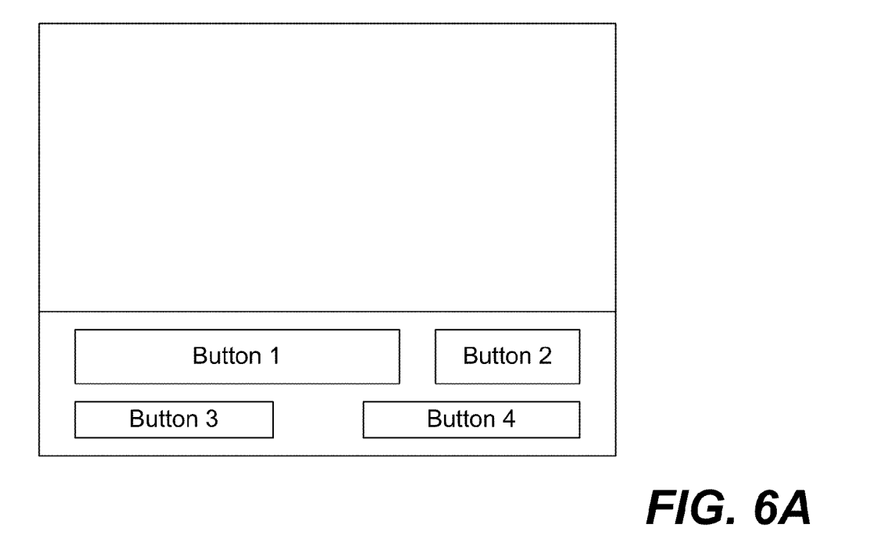
Figure 6B:
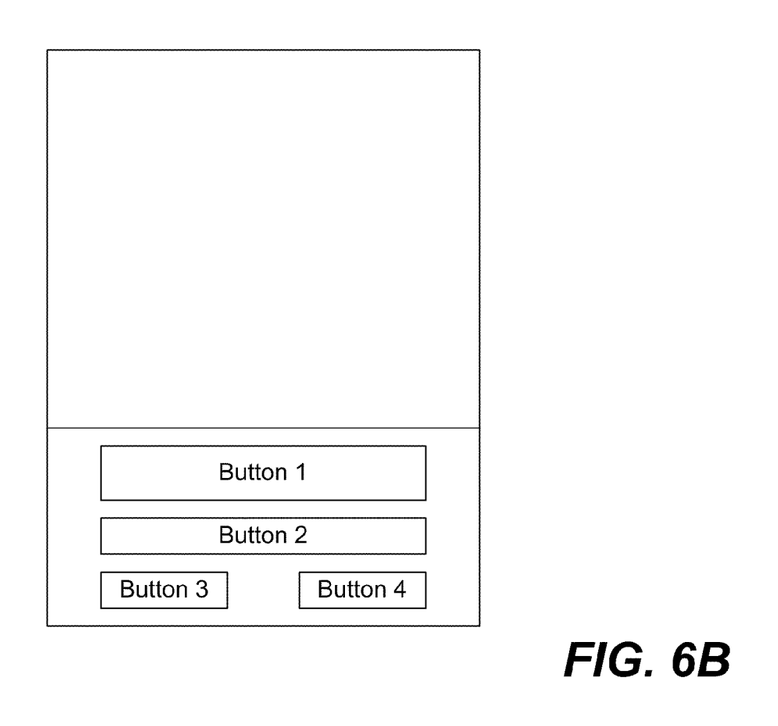

In one embodiment, the notification framework module 228 customizes the notification display based on the mode of delivery and the orientation of the screen 130 (e.g., screen displays vertically or horizontally). For example, the layout of a popup dialog for a same notification message displayed in landscape mode can be different from the layout displayed in portrait mode, as illustrated in FIGS. 6A and 6B.

The notification framework module 228 can generate the layout based on semantic description of components on the popup (e.g., selectable software icons or buttons) provided by the alerting application (e.g., through the API). Examples of the semantic description include importance of the associated button (e.g., primary, secondary), and whether the associated button is resizable.

By tailoring the notification layout based on the mode of delivery and the orientation of the screen 130, the notifications are not only delivered in a mode appropriate for a current user experience, but also displayed in a layout appropriate for the current display, thereby ensures that the user is properly informed and can respond to the notification properly.

Additional Configuration Considerations

In one embodiment, the notification framework module 228 takes into account additional characteristics of the active application (or the alerting application) to determine the appropriate notification delivery mode. For example, the notification framework module 228 may deliver notifications differently for different categories or subcategories of active applications and/or alerting applications (e.g., games, media players, web browsing applications, phone application). For example, the notification framework module 228 my temporarily suppress notification selection for transient banner notifications while the user is playing first-person shooting games to prevent false activation, while does not suppress such user interaction for board games. In addition, the disclosed invention can be used to deliver notifications in appropriate non-visual modes, such as aural notification and haptic notification (e.g., vibration).

Some portions of above description describe the embodiments in terms of algorithms and symbolic representations of operations on information, for example, as illustrated and described with respect to FIG. 4. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for delivering notifications in a manner that is appropriate for the user's current experience through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for displaying a notification on a display of a mobile computing device, comprising:

storing (i) a first delivery configuration associated with an alerting application, the first delivery configuration specifying that a notification is to be delivered as an icon on a notification bar, and (ii) a second delivery configuration associated with an active application, the second delivery configuration specifying that the notification is to be delivered as a pop-up message;

operating the active application in a full screen mode, wherein the notification bar is not displayed on the display in the full screen mode, and wherein the notification bar is displayed on the display in a non-full screen mode;

while the active application is being operated, detecting a notification alert generated by the alerting application;

determining which of the first or second delivery configuration is to control how to provide the notification alert by detecting whether the notification bar is being displayed; and in response to determining that the second delivery configuration is to control how to provide the notification alert, generating the notification alert as a selectable transient banner that overlays the active application, providing the notification alert as a pop-up message, and pausing the active application while the notification alert is displayed;

receiving a user selection of the transient banner;

when the user selection of the transient banner is received within a predetermined period of time after the transient banner is generated, ignoring the user selection to prevent false notification activation, without transmitting the user selection to the alerting application; and when the user selection of the transient banner is received after the predetermined period of time, transmitting the user selection to the alerting application.

2. The method of claim 1, further comprising:

determining a user preference of the active application, and wherein determining which of the active application or the alerting application is to control how to provide the notification alert is based on the user preference of the active application.

3. The method of claim 1, further comprising:

determining a category of the active application, and wherein determining which of the active application or the alerting application is to control how to provide the notification alert is based on the category of the active application.

4. The method of claim 1, wherein providing the notification alert further comprises:

generating a layout of the notification alert based on the delivery configuration of the determined one of the active application or the alerting application, an orientation of the display, and a semantic description of components of the notification provided by the alerted application; and displaying, on the display, the generated layout of the notification.

5. The method of claim 1, wherein in response to determining that the active application has terminated, providing a notification icon on the notification bar.

6. The method of claim 1, wherein providing the notification alert further comprises providing a selectable feature on the display, and wherein providing the notification alert further comprises hiding the notification alert in response to the selectable feature not being selected for a predetermined period of time.

7. The method of claim 1, wherein providing the notification alert as a pop-up message further comprises:

displaying a pop-up dialog box comprising a message and one or more buttons for user selection, and the pop-up dialog box is dismissed after receiving a user selection for one of the buttons.

8. A non-transitory computer-readable storage medium encoded with executable computer program code for displaying a notification on a display of a mobile computing device, the computer program code comprising program code for:

storing (i) a first delivery configuration associated with an alerting application, the first delivery configuration specifying that a notification is to be delivered as an icon on a notification bar, and (ii) a second delivery configuration associated with an active application, the second delivery configuration specifying that the notification is to be delivered as a pop-up message;

operating the active application in a full screen mode, wherein the notification bar is not displayed on the display in the full screen mode, and wherein the notification bar is displayed on the display in a non-full screen mode;

while the active application is being operated, detecting a notification alert generated by the alerting application; and determining which of the first or second delivery configuration is to control how to provide the notification alert by detecting whether the notification bar is being displayed; and in response to determining that the second delivery configuration is to control how to provide the notification alert, generating the notification alert as a selectable transient banner that overlays the active application, providing the notification alert as a pop-up message, and pausing the active application while the notification alert is displayed;

receiving a user selection of the transient banner;

when the user selection of the transient banner is received within a predetermined period of time after the transient banner is generated, ignoring the user selection to prevent false notification activation, without transmitting the user selection to the alerting application; and when the user selection of the transient banner is received after the predetermined period of time, transmitting the user selection to the alerting application.

9. The storage medium of claim 8, wherein the computer program code further comprises program code for:

determining a user preference of the active application, and wherein determining which of the active application or the alerting application is to control how to provide the notification alert is based on the user preference of the active application.

10. The storage medium of claim 8, wherein the computer program code further comprises program code for:

determining a category of the active application, and wherein determining which of the active application or the alerting application is to control how to provide the notification alert is based on the category of the active application.

11. A mobile computing device, comprising:

a display;

a processor; and a non-transitory computer-readable storage medium encoded with executable computer program code for executing by the processor to display a notification on the display of the mobile computing device, the computer program code comprising program code for:

storing (i) a first delivery configuration associated with an alerting application, the first delivery configuration specifying that a notification is to be delivered as an icon on a notification bar, and (ii) a second delivery configuration associated with an active application, the second delivery configuration specifying that the notification is to be delivered as a pop-up message;

operating the active application in a full screen mode, wherein the notification bar is not displayed on the display in the full screen mode, and wherein the notification bar is displayed on the display in a non-full screen mode;

while the active application is being operated, detecting a notification alert generated by the alerting application;

determining which of the first or second delivery configuration is to control how to provide the notification alert by detecting whether the notification bar is being displayed; and in response to determining that the second delivery configuration is to control how to provide the notification alert, generating the notification alert as a selectable transient banner that overlays the active application, providing the notification alert as a pop-up message, and pausing the active application while the notification alert is displayed;

receiving a user selection of the transient banner;

when the user selection of the transient banner is received within a predetermined period of time after the transient banner is generated, ignoring the user selection to prevent false notification activation, without transmitting the user selection to the alerting application; and when the user selection of the transient banner is received after the predetermined period of time, transmitting the user selection to the alerting application.

12. The mobile computing device of claim 11, wherein the computer program code further comprises program code for:

determining a user preference of the active application, and wherein the determining which of the active application or the alerting application is to control how to provide the notification alert is based on the user preference of the active application.

* * * * *